(12) United States Patent
King (10) Patent No.: US 11,528,964 B1
(45) Date of Patent: Dec. 20, 2022

(54) DRAWSTRING CLASP WITH ENCLOSED CLUTCH

(71) Applicant: Launi King, Newhall, CA (US)

(72) Inventor: Launi King, Newhall, CA (US)

( * ) Notice: Subject to any disclaimer, the term of this patent is extended or adjusted under 35 U.S.C. 154(b) by 0 days.

(21) Appl. No.: 17/412,928

(22) Filed: Aug. 26, 2021

Related U.S. Application Data (60) Provisional application No. 63/070,652, filed on Aug. 26, 2020.

(51) Int. Cl.
*A44B 6/00* (2006.01)
*B29D 99/00* (2010.01)

(52) U.S. Cl.
CPC .............. *A44B 6/00* (2013.01); *B29D 99/00* (2013.01)

(58) Field of Classification Search
CPC ... A44B 6/00; Y10T 24/4629; Y10T 24/4605; Y10T 24/4663; Y10T 24/4655; Y10T 24/4654; Y10T 24/4643; Y10T 24/4646; Y10T 24/3969; Y10T 24/3713; Y10T 24/45749; A43C 7/08; F16G 11/048
See application file for complete search history.

(56) References Cited

U.S. PATENT DOCUMENTS 711,812 A * 10/1902 Armstrong ........... A44B 11/266
24/657
5,852,853 A * 12/1998 Pennoyer, Jr. ........ F16G 11/106
24/134 P

* cited by examiner

*Primary Examiner* — Robert Sandy
(74) *Attorney, Agent, or Firm* — David A. Jones; Nadesan Beck P.C.

(57) ABSTRACT

A drawstring clasp having an enclosed locking mechanism and dual actuating mechanisms disposed on opposing sides of the drawstring clasp. A housing of the drawstring clasp and actuating button disposed on opposing sides of the housing can be configured to depict an ornamental feature. The ornamental feature can be the head of an animal, a baseball, a heart, or other ornamental feature.

17 Claims, 7 Drawing Sheets

DRAWSTRING CLASP WITH ENCLOSED CLUTCH

CROSS-REFERENCE TO RELATED APPLICATION

This patent application claims priority to and the benefit of U.S. Provisional Patent Application 63/070,652 filed Aug. 26, 2021, the contents of which are incorporated herein by reference in its entirety.

FIELD OF INVENTION

This invention relates generally to drawstrings clasps. More specifically, the invention relates to a drawstring clasp having an enclosed clutch.

BACKGROUND

Drawstrings may often be used in clothing to offer quick and easy adjustment of an opening. Other examples of drawstring use include apparel, backpacks, footwear, and accessories. It is also important for the drawstring to be secured when the desired opening is reached. While traditional knots may be used, they may be inconvenient in that they require additional time to tie and untie as necessary. Clasps or toggles are currently used but they fail to offer adequate resilience and have an exposed portion that can easily allow hair or other items to be caught in the clasp.

Thus, there is a need for a drawstring clasp that offers a high gripping power while minimizing catching hair.

BRIEF SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

It is an object to provide a drawstring clasp that has a wholly enclosed clutch such that hair and other objects are not likely to get caught in the drawstring clasp. It is an object to provide a drawstring clasp that securely grasps drawstrings. It is an object to provide drawstring clasps that are fashionable, contain designs, comprise shapes, or are otherwise aesthetically pleasing.

As opposed to traditional drawstring clasps the innovative designs disclosed herein include a unique tooled housing and unique two button activation. When the two buttons are pressed, this activates and releases the entrapped hair and/or drawstring(s). As opposed to a single spring that applies tension, the designs disclosed herein have two opposing springs that enable additional holding power so that the drawstrings do not retract into the hoodie, for example.

A drawstring clasp can include a housing, a first actuating mechanism and a second actuating mechanism. The drawstring clasp can further include two biasing mechanisms. The biasing mechanisms can include springs that bias the actuating mechanisms outward from within the housing. The actuating mechanisms can comprise inward facing teeth for gripping a drawstring.

The drawstring clasp can have the first actuating mechanism comprising a first button formed integral with a first arm connected to a first set of inward facing teeth. The second actuating mechanism comprising a second button formed integral with a second arm connected to a second set of inwardly facing teeth. The housing and buttons form a cube, the first button and second button being square and disposed on opposing sides of the cube. The housing can be at least 18 millimeters in height and at least 18 millimeters in width.

The housing and buttons can be molded to depict a head of an animal. The housing and actuating mechanism can include buttons collectively being molded in the shape of a heart.

The buttons can be disposed on the sides of the housing and being concave to depict the sides of the heart. When the buttons are in an outermost position, the heart-shaped housing and buttons can be at least 25 millimeters in height and 30 millimeters in width.

When the buttons are in an outermost position, the housing and the buttons can be collectively at least 25 millimeters in height and 30 millimeters in width.

The housing and actuating mechanism including buttons can be collectively molded in the shape of a baseball.

The inwardly facing teeth grip a drawstring when not pressed into the housing against a bias force of the springs.

The actuating mechanisms include buttons that have a circular outer perimeter shape.

The drawstring clasp can further include a microphone and memory disposed within the housing of the drawstring clasp, the microphone and memory being configured to store and play music.

The drawstring extending through openings in the housing of the drawstring clasp and being compressed by the inward facing teeth and biasing mechanisms.

Other features and advantages are inherent in the crank assemblies claimed and disclosed will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIG. 9 is a top view illustration of the internal mechanisms and structures of the cube-shaped drawstring clasp having the locking mechanism disengaged from the drawstring and the buttons pressed in.

DETAILED DESCRIPTION OF THE DRAWINGS

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Also, the reference or non-reference to a particular embodiment of the invention shall not be interpreted to limit the scope of the invention.

As opposed to traditional drawstring clasps the innovative designs disclosed herein include a unique tooled housing and unique two button activation. When the two buttons are pressed, this activates and releases the entrapped hair and/or drawstring(s). As opposed to a single spring that applies tension, the designs disclosed herein have two opposing springs that enable additional holding power so that the drawstrings do not retract into the hoodie, for example.

Figure 1:
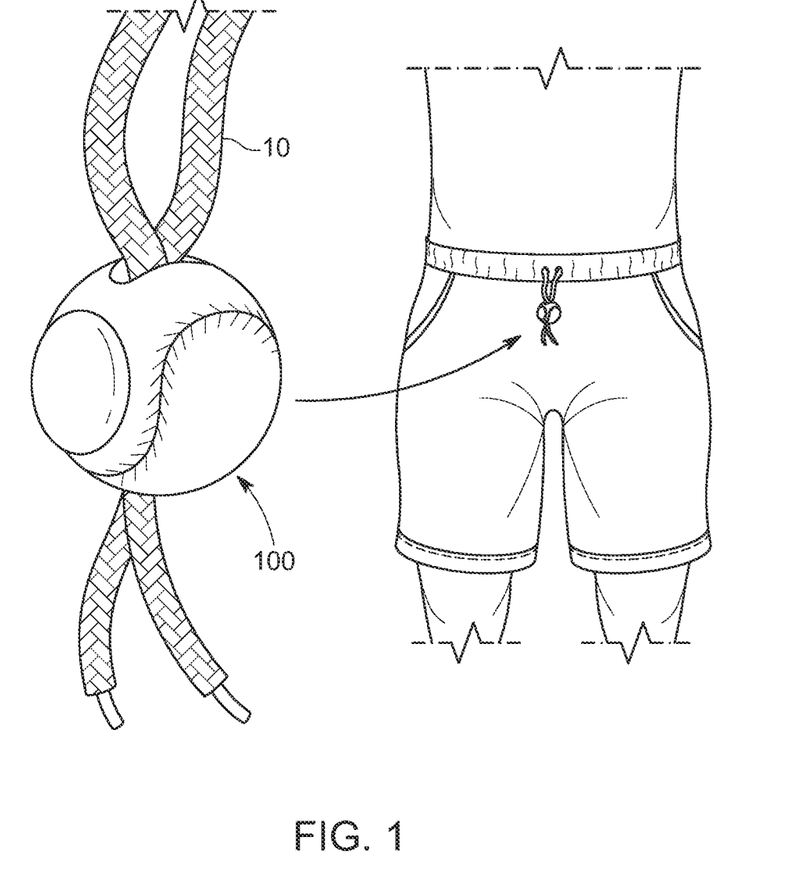
FIG. 1 illustrates a drawstring clasp having a circular housing in the shape of a baseball coupled to the drawstrings of a pair of shorts.
Figure 2:
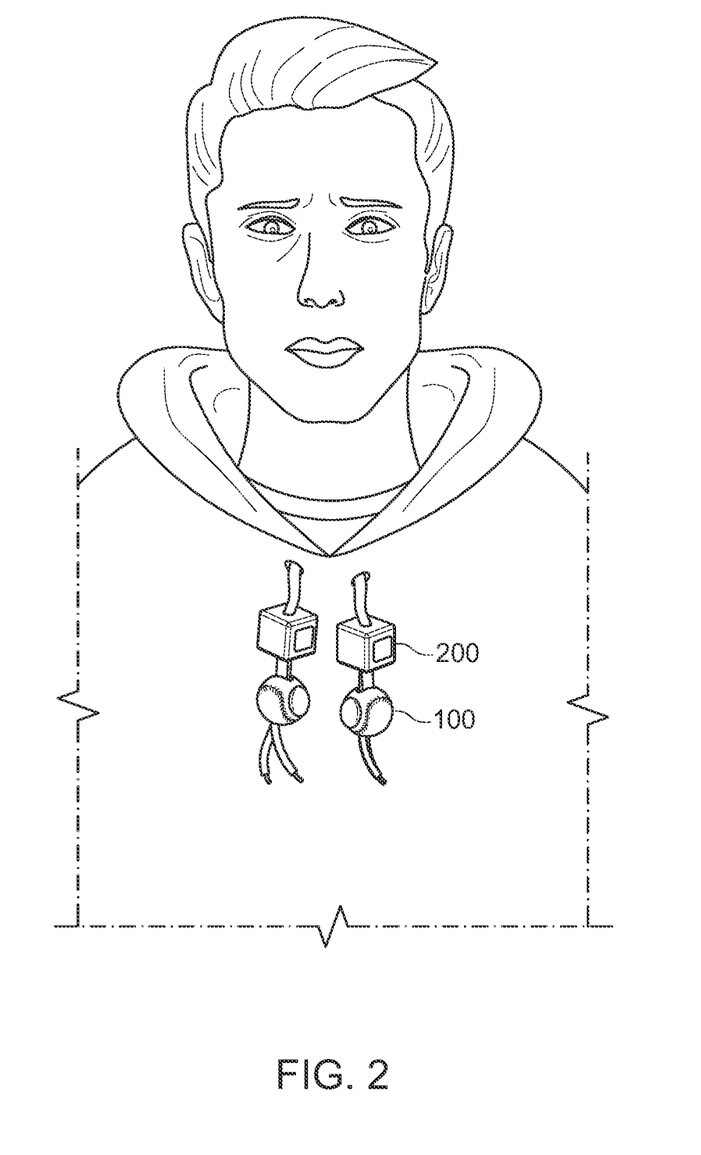
FIG. 2 illustrates a plurality of drawstring clasps coupled to the drawstrings of a hooded sweatshirt.
Figure 3:
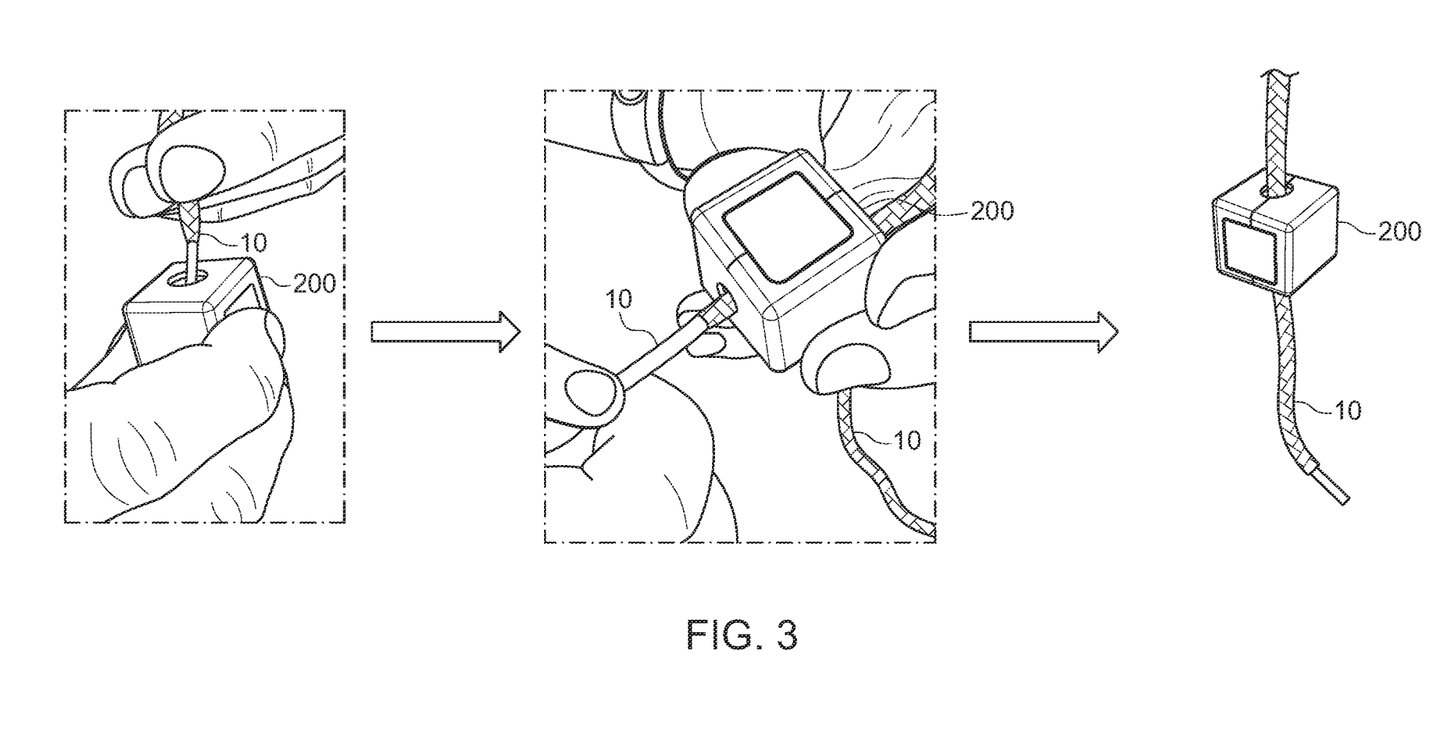
FIG. 3 illustrates the placement of a drawstring clasp on a drawstring, the drawstring clasp having opposing square-shaped buttons and a housing in the shape of a cube.

FIG. 1 illustrates a drawstring clasp 100 having a baseball shape with a drawstring 10 extending therethrough and applied to the drawstrings of a pair of shorts. As shown in FIG. 2, the drawstring clasps 100 and 200 may be different three-dimensional geometric shapes, having pressable buttons on opposing sides. As shown in FIG. 3, when the pressable buttons are pressed, or squeezed inwards, the drawstring clasp 200 may loosen its grip on the drawstring 10 and allow the drawstring 10 to slide through the drawstring clasp 200 freely. The drawstring clasp 200 may be made of polypropylene, PVC, ABS, and other materials suitable for use. The drawstring clasp 200 may also comprise a sound module including a speaker and data storage media to produce sound.

FIG. 3 shows the drawstring clasp 200 and the drawstring 10 entering and being secured to the drawstring clasp 200. As shown in FIG. 2, a user may press buttons on the sides of the drawstring clasp 200 and place the drawstring through the drawstring clasp 200. In one embodiment, the buttons may be portions of an actuating mechanism. The drawstring clasp 200 may comprise two actuating mechanisms.

Figure 4:
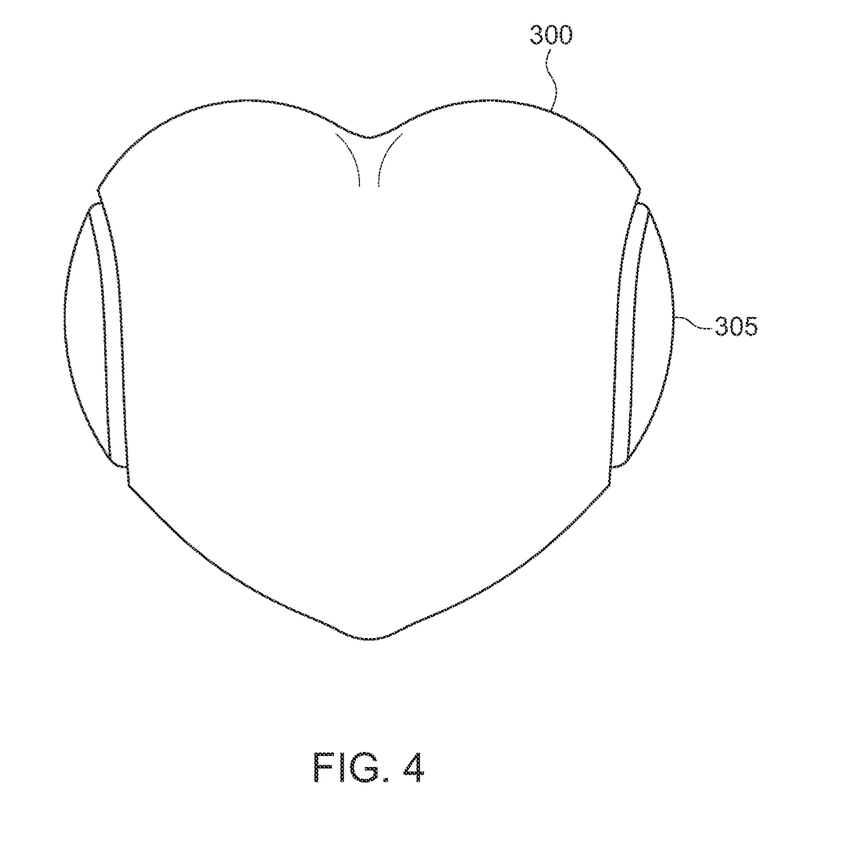
FIG. 4 illustrates a heart-shaped drawstring clasp having opposing buttons disposed on the lobes of the heart-shaped housing.

FIG. 4 illustrates a heart-shaped drawstring clasp 300 having two opposing buttons 305 disposed on the lobes of the heart-shaped drawstring clasp 300.

Figure 5:
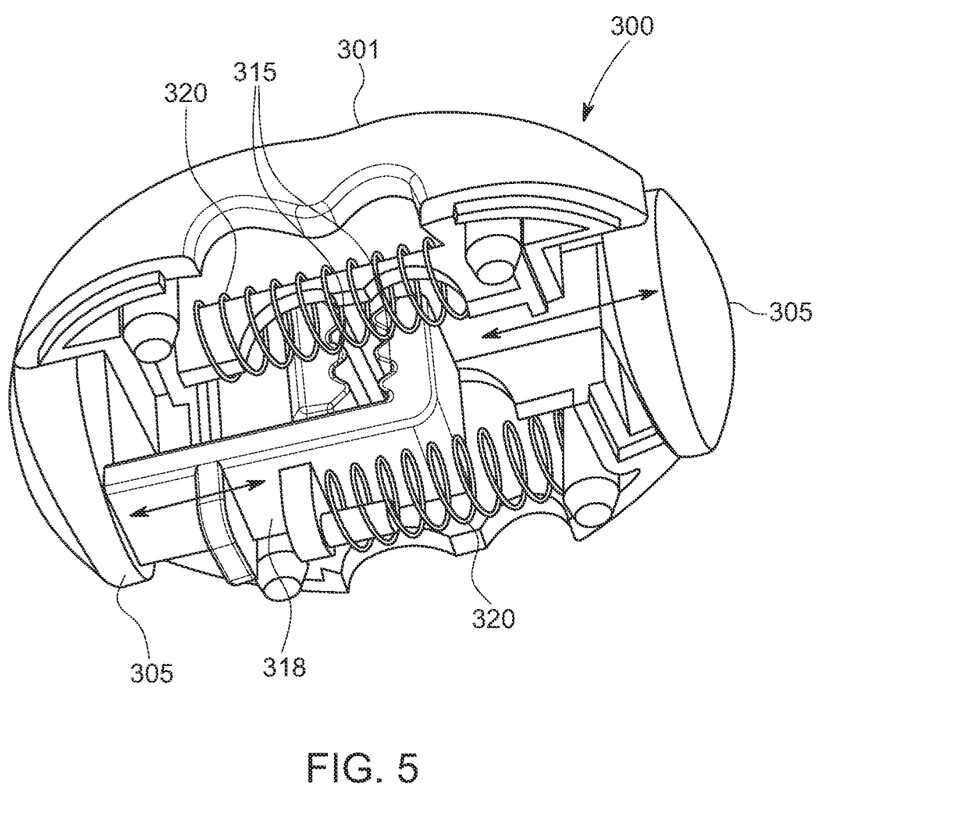
FIG. 5 is an illustration of the internal mechanisms of the heart-shaped drawstring clasp.

FIG. 5 illustrates the internal mechanisms of the heart-shaped drawstring clasp 300. As shown in FIG. 5, the heart-shaped drawstring clasp 300 may comprise a heart shaped housing 301.

FIG. 5 is an illustration of the internal mechanisms of the heart shaped drawstring clasp 300. As shown in FIG. 5, the drawstring clasp 300 may comprise a first housing component 301, two button assemblies 305, and two springs 320. The drawstring clasp 300 may also comprise a second housing component not shown that is substantially complementary to the first housing component 301 and engages the first housing component 301 to encapsulate the button assemblies 305.

Figure 6:
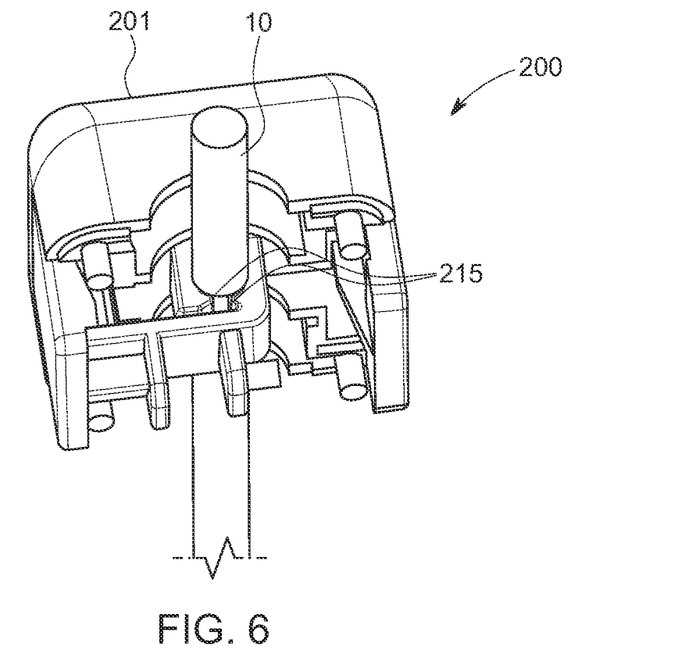
FIG. 6 is an illustration of the internal mechanism of a cube-shaped clasp with a locking clutch mechanism engaging a drawstring.
Figure 7:
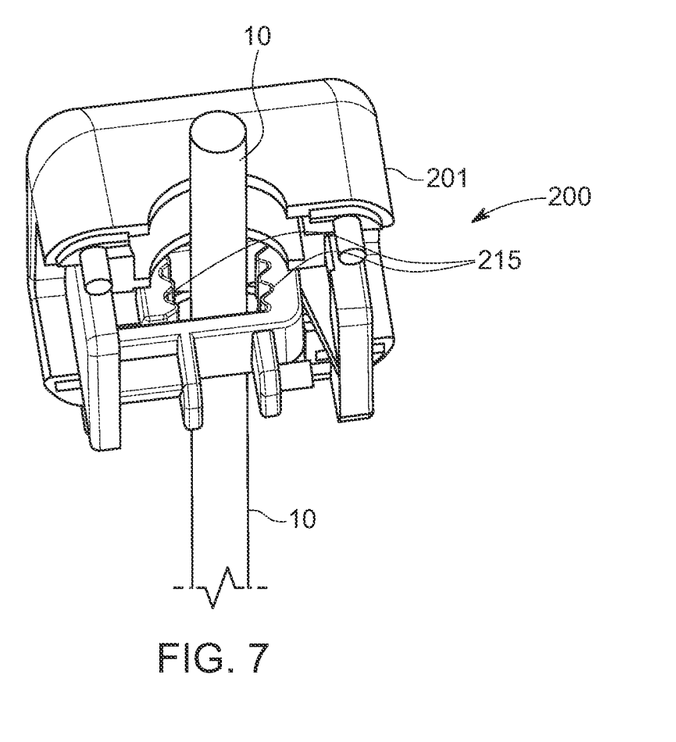
FIG. 7 is an illustration of the internal mechanisms and structures of the cube-shaped drawstring clasp having the locking mechanism disengaged and buttons depressed.
Figure 8:
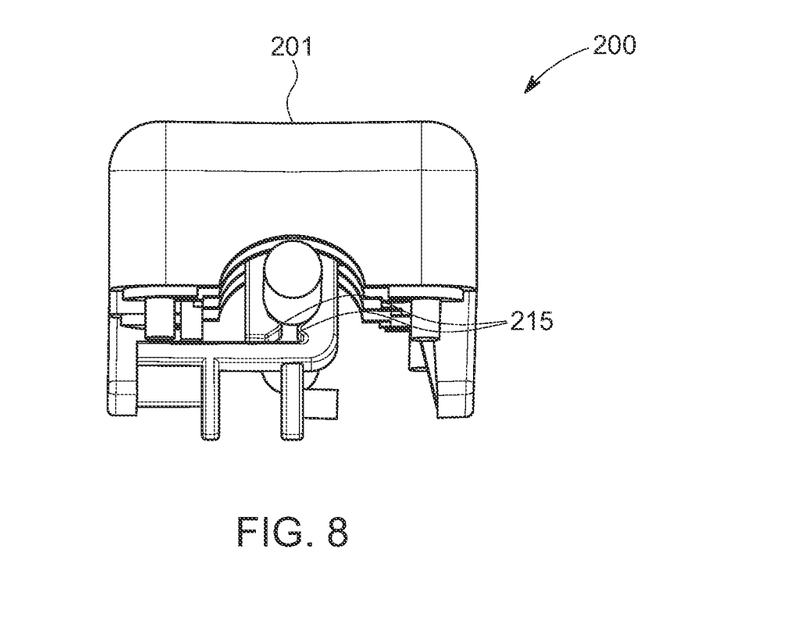
FIG. 8 is an illustration of the internal mechanism of the cube-shaped clasp with the locking clutch mechanism engaging the drawstring.
Figure 9:
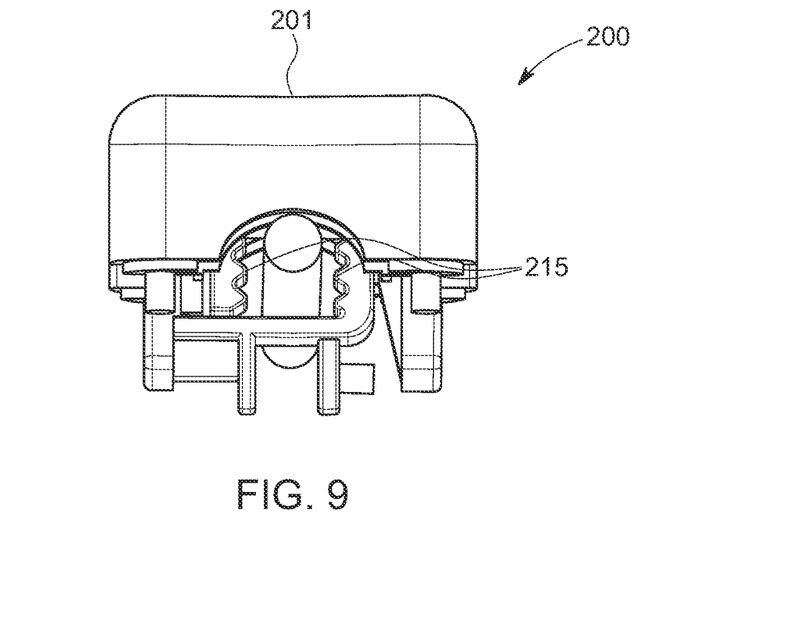

The button assemblies 305 may be biased in an outward direction by the springs 320, wherein the housing 301 comprises physical structures that provide outer bounds as to the scope of movement of the button assemblies 305. The button assemblies 305 may be configured to move only in a linear fashion, such that when they are pressed inward, the button assemblies 305 move toward one another, thereby causing a locking portion of the button assemblies 305 to move away from each other and disengage from one another or from a drawstring as shown in FIGS. 6-8. The locking portion 315 shown in FIGS. 5 and 215 shown in FIGS. 6-8 of the button assemblies 300 and 200, respectively, may comprise teeth, or other gripping portions and shapes.

Referring to FIGS. 5 and 6-8, as opposed to traditional drawstring clasps the innovative designs disclosed herein include a unique tooled housing and unique two button 205 and 305 activation. When the two buttons 205 and 305 are pressed, this activates and releases the entrapped hair and/or drawstring(s) 10. As opposed to a single spring that applies tension, the designs disclosed herein have two opposing springs 320 (not shown in FIGS. 6-8) that enable additional holding power so that the drawstrings 10 do not retract into the garment, for example.

A drawstring clasp 200 and 300 can include a housing 201 and 301, a first actuating mechanism 305 and 205 and a second actuating mechanism 305 and 205. The drawstring clasp 200 and 300 can further include two biasing mechanisms 320 (not shown in FIGS. 6-8. The biasing mechanisms 320 can include springs 320 that bias the actuating mechanisms 305 and 205 outward from within the housing 201 and 301. The actuating mechanisms 205 and 305 can comprise inward facing teeth 215 and 315 for gripping a drawstring. 10

The drawstring clasp 300 and 200 can have the first actuating mechanism 305 and 205 comprising a first button formed integral with a first arm connected to a first set of inward facing teeth 215 and 315. The second actuating mechanism 305 and 205 comprising a second button formed integral with a second arm connected to a second set of inwardly facing teeth 215 and 315.

Referring to FIGS. 6-9, the housing 201 and buttons 205 can form a cube, the first button and second button 305 being square and disposed on opposing sides of the cube. The housing 201 can be at least 18 millimeters in height and at least 18 millimeters in width, for example.

The housing and buttons can be molded to depict a head of an animal. The housing 301 and actuating mechanism 305 can include buttons collectively being molded in the shape of a heart as shown in FIGS. 3 and 4. The buttons 305 can be disposed on the sides of the housing 301 and being convex to depict the sides of the heart. When the buttons 305 are in an outermost position, the heart-shaped housing 301 and buttons 305 can be at least 25 millimeters in height and 30 millimeters in width. When the buttons 305 are in an outermost position, the housing 301 and the buttons 305 can be collectively at least 25 millimeters in height and 30 millimeters in width.

The housing and actuating mechanism including buttons can be collectively molded in the shape of a baseball as shown in FIGS. 1 and 2. The inwardly facing teeth grip a drawstring 10 when not pressed into the housing against a bias force of the springs. The actuating mechanisms can include buttons that have a circular outer perimeter shape.

As shown in FIG. 5, the springs may, on one end, engage the button assemblies 305, and on their other end, engage the housing 301.

The housing 301 may comprise an inlet and an outlet, such that the drawstring may pass through the housing 301 and in between the locking portion 315 of the button assemblies 305.

The button assemblies 305 may also be referred to herein as actuating mechanisms. The actuating mechanisms 305 may be substantially any structure capable of having more than one position relative to the housing 301. The springs 320 may be referred to herein as biasing mechanisms. Other examples of biasing mechanisms may be substantially anything that applies an outward tension to the actuating mechanisms.

FIGS. 6-8 illustrate the internal mechanisms of the cube shaped drawstring clasp 200. As shown in FIGS. 6-8, the cube shaped drawstring clasp 200 may comprise a cube shaped housing 201. In FIGS. 6 and 8, the locking mechanism 215 engages the drawstring 10 with the buttons released. And, in FIGS. 7 and 9, the buttons are depressed thereby releasing the drawstring 10 from engagement.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A drawstring clasp, comprising:
a housing;
a first pressable actuating mechanism including a first button disposed at a first side of the housing, the first pressable actuating mechanism further comprising a first set of inward facing teeth;
a second pressable actuating mechanism including a second button disposed at a second side of the housing, the second pressable actuating mechanism further comprising a second set of inward facing teeth; and
two biasing mechanisms, wherein said biasing mechanisms include springs that bias the actuating mechanisms outward from within the housing; and
wherein the first set of teeth of the first actuating mechanism and the second set of teeth of the second actuating mechanism are biased in opposite directions and are configured to grip and hold a drawstring.

2. The drawstring clasp according to claim 1, the first actuating mechanism comprising the first button formed integral with a first arm connected to the first set of inward facing teeth.

3. The drawstring clasp according to claim 2, the second actuating mechanism comprising the second button formed integral with a second arm connected to the second set of inwardly facing teeth.

4. The drawstring clasp according to claim 3, wherein the housing and buttons form a cube, the first button and second button have a square shape and are disposed on opposing sides of the cube-shaped housing.

5. The drawstring clasp according to claim 4, the housing being at least 18 millimeters in height and at least 18 millimeters in width.

6. The drawstring clasp according to claim 5, the width of the drawstring clasp being 18.8 millimeters and the height of the drawstring clasp being 18.8 millimeters and configured to depict a molded feature thereon.

7. The drawstring clasp according to claim 5, the housing and buttons being molded to depict a head of an animal.

8. The drawstring clasp according to claim 1, the housing and the buttons collectively being molded in the shape of a heart.

9. The drawstring clasp according to claim 8, the buttons being disposed on the sides of the housing and being convex to depict the sides of the heart.

10. The drawstring clasp according to claim 8, wherein when the buttons are in an outermost position the housing and buttons are at least 25 millimeters in height and 30 millimeters in width.

11. The drawstring clasp according to claim 8, wherein when the buttons are in an outermost position the housing and the buttons collectively are at least 25 millimeters in height and 30 millimeters in width.

12. The drawstring clasp according to claim 1, wherein the housing and the actuating mechanisms including the buttons collectively being molded in the shape of a baseball.

13. The drawstring clasp according to claim 1, wherein the inwardly facing teeth of each of the actuating mechanisms grip a drawstring when not pressed into the housing against a bias force of the springs.

14. The drawstring clasp according to claim 1, wherein the buttons of the actuating mechanisms have a circular outer perimeter shape.

15. The drawstring clasp according to claim 1, further comprising a microphone and memory disposed within the housing of the drawstring clasp, the microphone and memory being configured to store and play music.

16. The drawstring and drawstring clasp according to claim 1, the drawstring extending through the drawstring clasp and being compressed by the inward facing teeth and the biasing mechanisms.

17. The drawstring clasp according to claim 1, the housing including an opening being between 4 and 5 millimeters in diameter.

* * * * *